Jan. 7, 1958 T. BLACKMAN 2,818,700
COTTON STRIPPER UNIT WITH COLLAPSIBLE HOOD
Filed Sept. 17, 1954 3 Sheets-Sheet 1

INVENTOR.
THOMAS BLACKMAN
BY
Carlson & Hagle
ATTORNEYS

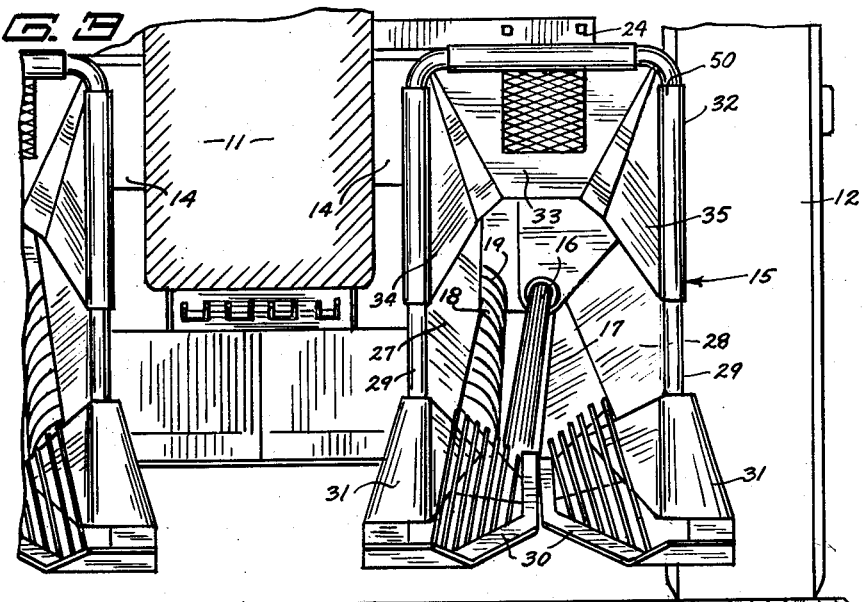
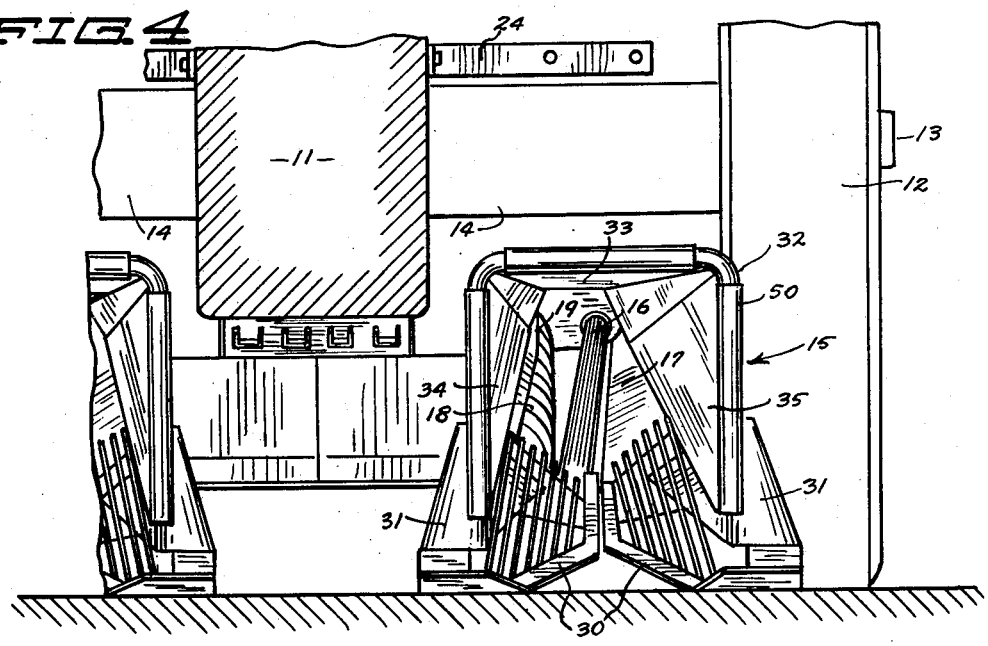

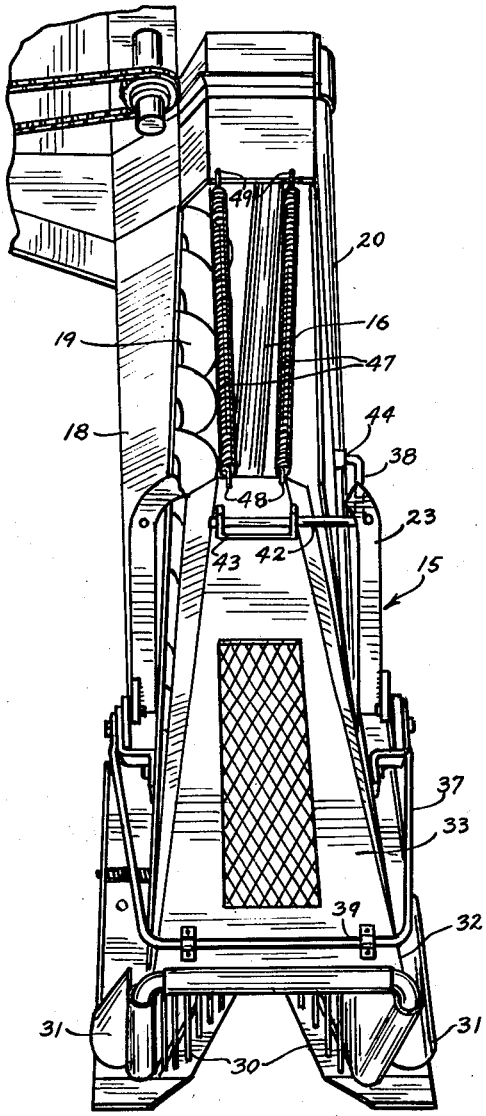

United States Patent Office 2,818,700
Patented Jan. 7, 1958

2,818,700

COTTON STRIPPER UNIT WITH COLLAPSIBLE HOOD

Thomas Blackman, Louisville, Ky., assignor to Minneapolis-Moline Company, Hopkins, Minn., a corporation of Minnesota Application September 17, 1954, Serial No. 456,826

7 Claims. (Cl. 56—33)

This invention relates generally to cotton harvesting and more particularly to tractor mounted cotton strippers.

Tractor mounted cotton harvesters or strippers normally have two stripping units which are carried at opposite sides of the tractor engine in such transversely spaced relation as to enable stripping of two adjacent rows of cotton on one trip through the field. These units each extend forwardly from the rear axle of the tractor alongside the engine and between the engine and the line of travel of the rear tractor wheel. Each unit has a forwardly opening throat at its front end for guiding the crop into the stripping mechanism as the tractor advances through the field, the throat being formed by a pair of transversely spaced upright gathering walls. For effective operation it is necessary that the gatherers be of a height which is greater than the space from the rear axle housing to the ground. Furthermore, the stripper is generally provided with an upwardly and rearwardly extending elevator at its rear end which extends far above the tractor rear axle. Thus with harvester parts both fore and aft of the tractor rear axle being necessarily higher than the bottom of the axle housing, it has heretofore been impossible to mount the stripper on the tractor or dismount it therefrom without first removing the stripper units from the balance of the machine. It is the purpose of the present invention to eliminate this problem to render mounting and dismounting of the stripper with respect to the tractor a much simpler and quicker operation.

The primary object of the present invention is to provide a cotton stripper which might be mounted on or dismounted from a tractor without disassembling the stripper.

Another and more specific object of the invention is to provide a cotton stripper for mounting on a tractor with a vertically collapsible gathering means adapted to be collapsed to a height less than the elevation of the tractor rear axle housing whereby the tractor axle may be driven over the gatherers during the mounting and dismounting operations.

Still another specific object of the invention is to provide a gathering hood for cotton strippers which may be readily adjusted between a lowered collapsed condition and an erected raised condition and having means for assisting in the adjustment of the hood to and yieldably retaining it in its erected condition.

Still another object of the invention is to provide a gatherer or housing for a stripping unit of a cotton stripper having an upper section which is connected to a lower section for manual raising and lowering movement with respect thereto between operative and non-operative positions and having spring means for asisting in the manual raising of the upper section to an operative position.

With these and other objects in view the invention broadly comprises providing a tractor mounted cotton stripper unit adapted to extend forwardly from under the rear axle housing of the tractor with a pair of longitudinally extending transversely spaced side walls for guiding cotton into the stripping mechanism of the unit as the tractor advances through a field, said walls having a vertical height which is less than the elevation of the tractor axle housing, a hood member covering the space between the side walls and being slidably associated therewith for movement between a raised operating position and a lowered non-operating position below said housing elevation, and means for assisting movement of the hood to releasably lock it in a raised position.

The above mentioned and still additional objects of the invention will be brought to light during the course of the following specification, reference being made to the accompanying drawings, in which—

Fig. 3 is an enlarged front elevation of the stripper with the hood in erected or operating position.

Fig. 4 is similar to Fig. 3 but showing the hood member collapsed for dismounting of the implement from the tractor.

Fig. 5 is a plan view of the unit with the hood collapsed.

Figure 1:
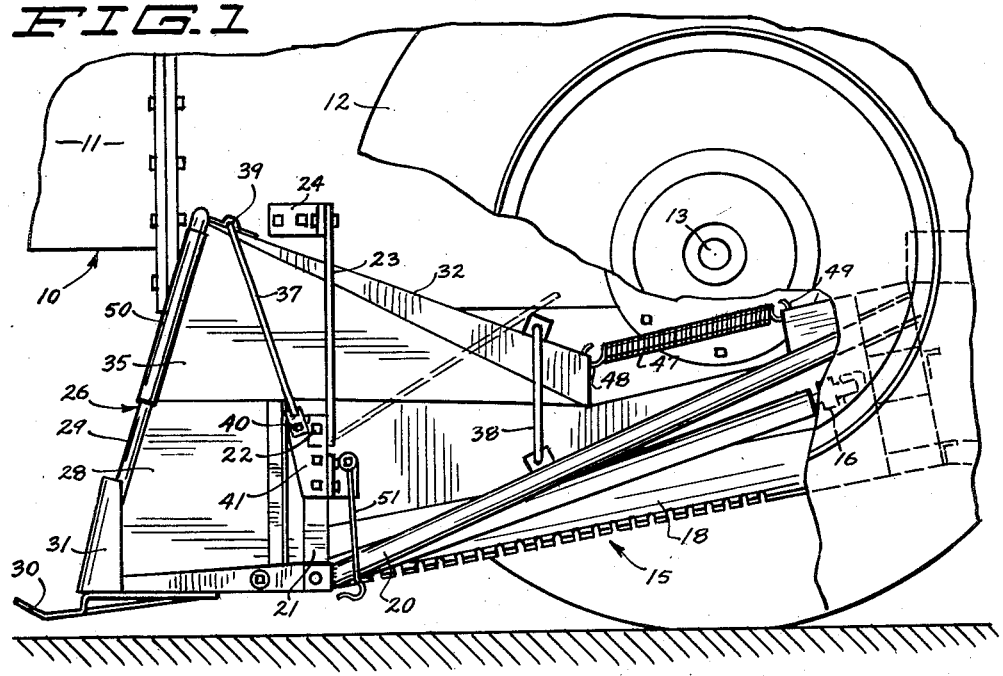
Fig. 1 is a side elevation of the stripper unit mounted on a tractor with the housing hood in raised or operating position. The near rear wheel of the tractor is partially broken away.

Referring now more particularly to the drawings reference characters will be used to denote like parts or structural features in the different views. In the various figures the tractor on which the cotton stripper is mounted is denoted generally by the number 10. It has a forwardly extending center engine mounting 11, and rear traction wheels 12 at the ends of axles 13 which are journaled in the axle housing 14. The wheels 12 are arranged in conventional manner with their lines of travel spaced laterally from the engine mounting as shown in Figs. 3 and 4.

Cotton strippers of the type to which this invention is related normally have two stripping units mounted to extend longitudinally one at each side of the tractor in the space between the engine and the rear wheel. Here these units are each designated by the number 15 and inasmuch as the units are identical in construction only one is herein shown and described in detail.

Referring first to Figs. 3 and 4, the unit 15 has stripping mechanism comprising a rotary stripper roll 16 which works in combination with a stripper plate 17 disposed alongside the roll to remove cotton bolls from plants received between the roll and plate as the machine advances through the field. The stripped cotton then tumbles laterally into a cleaning trough 18 (Fig. 1) within which there is disposed a rotatable auger 19 adapted to move the cotton rearwardly in the trough. At the rear end of the trough 18 there is suitable transverse conveyor mechanism (not shown) for uniting the cotton streams from the units 15 for further rearward conveyance in an upwardly inclined elevator or the like to a transport wagon. The cotton stripping and conveying apparatus as thus far described is of conventional construction.

The stripping roll 16, plate 17, trough 18 and auger 19 are supported in their forwardly extending positions on a suitable frame structure mounted to provide for limited vertical swinging about a transverse axis at its rear end. This frame includes a beam 20 (Fig. 1) having its forward end connected to an upright 21. The upper end of member 21 carries a pivotal connection 22 with the end of a bail 23, the bight portion of which is attached to the bracket 24 mounted on the tractor 10 to support the front end of the unit 15. The inner end of the bail 23 also has a suitable pivotal connection with the frame structure on the inner side of the unit on a common axis with the pivot 22. Of course, there is provided suitable mechanism, partially shown at 25, for driving the stripper roll 16 and the auger 19 from the power take-off of the tractor.

Each unit 15 is provided with a combination housing and gathering structure, which might be referred to as a gathering shield, designated generally at 26, for enclosing the stripping mechanism and for guiding the upper plant portions into said mechanism. It is with improvement in this structure that the present invention pertains. The unit has a pair of side sheets or walls mounted on the aforementioned frame and which are designated herein as the inner wall 27 and the outer wall 28. The wall 27 is disposed beside the auger 19 and connects with the trough 18. The outer wall 28 has its lower portion angle downwardly and inwardly to provide a support for the stripper plate 17. The two walls diverge slightly in their forward extension and extend substantially beyond the forward ends of the stripping roll 16 and plate 17. It will be observed in Figs. 1 and 2 that the height of the walls 27 and 28 is somewhat less than the distance from the axle housing 14 to the ground. The leading edges of the walls are curled outwardly to form lips 29 which extend upwardly at a slight rearward angle to the vertical as shown. At its front end the unit is provided with a pair of opposing spring tensional vine lifters 30 which may be augmented when necessary with stalk lifters 31 mounted on the side walls to guide the cotton plants into the passageway between the roll 16 and the plate 17 as the unit advances.

The front portions of the walls 27 and 27 also serve as gatherers for guiding the plants between the walls and into the stripping mechanism. These wall portions combine with a collapsible hood, denoted generally at 32 to carry out this function. The hood has a top wall 33 and inner and outer side walls 34 and 35, respectively, all of which are integrally related to form a rearwardly tapering closure which is open at its front, rear and bottom sides. The hood is slightly narrower than the passageway formed by the side walls 27 and 28 so that it may be moved downwardly between the same.

Figure 2:
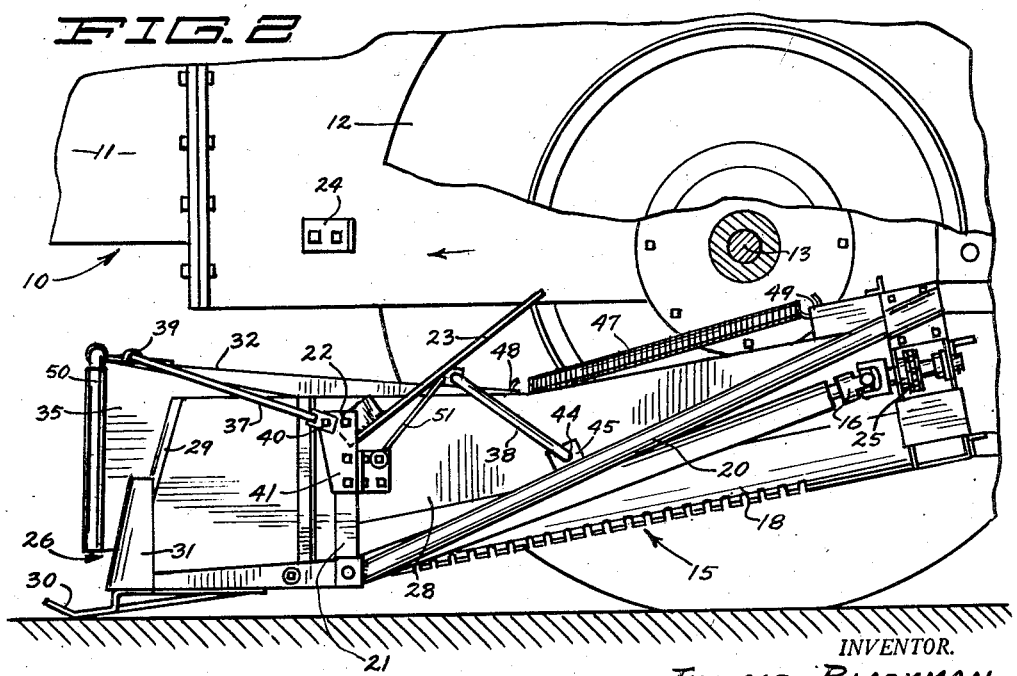
Fig. 2 is similar to Fig. 1 but with the hood in collapsed or non-operating position.

The hood 32 is swingably associated with the side walls 27 and 28 for raising and lowering movement with respect thereto between the operating position shown in Figs. 1 and 3 and the collapsed position shown in Figs. 2 and 4. This swinging connection is effected by fore and aft links denoted at 37 and 38 respectively. The front link 37 is U-shaped and has its central portion journaled for rotation in strap bearings 39 mounted at a forward point on the top wall 33 of the hood (Fig. 5). The end portions of link 37 extend downwardly in parallelism and are pivoted at points 40 to suitable brackets 41 mounted on the unit frame structure. The rear link 38 has a cross portion 42 journaled for rotation on a transverse axis in the bracket 43 mounted near the rear edge of the top wall and a right angular extension, the distal end of which is pivotally connected at 44 with a bracket 45 on the frame. It will be understood that the various link pivots have parallel axes whereby as upward pressure is exerted upon the collapsed hood the links will carry it upwardly and rearwardly to the position shown in Fig. 1 with both links swinging to an upright position and link 38 in fact going slightly over the axis of pivot 44.

A pair of helper springs 47 have their forward ends connected to the hood as at 48 and their rear ends connected to the unit frame as at points 49. These springs are under constant tension and serve to assist manual efforts to raise the hood as well as to yieldably retain the hood in its raised or operating position. The front edge of each of the hood side walls 34 and 35 is provided with a curled marginal lip 50 which extends laterally outward in front of the adjacent side wall lip 29. This rolled edge not only presents a smooth gathering throat but also the engagement between the lips 50 and 29 limits rearward movement of the hood to the most desirable operating position and guides the movement of the hood to movement on a vertical path.

The advantages of the collapsible hood will be readily understood. When the harvester is not in use and is dismounted from the tractor the hood is in the lowered or collapsed position shown in Figs. 2 and 4. Springs 47 do not exert sufficient pull on the hood to remove it from its collapsed position without manual starting assistance to swing the link 37 to a position where it is at a greater angle to the direction of spring pull. When the hood is collapsed the entire stripping unit lies below a horizontal plane tangent to the underside of the axle housing 14. Accordingly, the tractor 10 may be backed over the collapsed units while they are still intact with the rear parts of the harvester. When the tractor has been backed into position the necessary rear harvester mountings are secured to the tractor as are the bails 23 fastened to brackets 24. The hoods 32 are then pulled upwardly and snapped into operating position by the springs 47.

In dismounting the harvester the hood is collapsed, the tractor connections are disengaged and the tractor can be driven away from the harvester, the axle 14 moving forwardly over the stripping units. A hook 51 may be provided for latching over the cross portion 42 of the link member 38 to lock the hood in collapsed position.

The top wall 33 may be provided with a perforate panel or grill as best shown in Fig. 5 to enable the tractor operator to view the stripping mechanism in operation.

It will be readily understood that the present invention not only provides a gatherer construction for cotton strippers which functions as effectively as any heretofore devised but which, in addition, eliminates much manual time and labor in the mounting and dismounting operations. The collapsible hood may be readily raised or lowered with a minimum of manual effort and firmly secured in either position. What's more the structure is sufficiently simple so that its incorporation adds little, if any, to the cost of the harvesting implement.

I have accordingly provided a gathering hood for cotton stripping units which economically and effectively carries out the aforementioned objectives. It is understood that suitable modifications may be made in the structure as disclosed, provided such modifications come within the spirit and scope of the appended claims. Having now therefore fully illustrated and described my invention, what I claim to be new and desire to protect by United States Letters Patent is:

1. In a cotton harvester adapted to be mounted on a draft implement, a stripper unit for following along the plant rows and having mechanism for removing cotton from the plants, a gathering shield on the stripper unit for guiding the plants into said mechanism as the harvester advances, said shield having upper and lower sections, the lower section being integral with the unit, the upper section pivotally associated with the lower section for vertical swinging movement between a raised operating position and a lowered non-operating position, spring means connecting the unit to said upper section to yieldably retain said section in one position, and locking means on the unit for locking said section in the other position against action of the spring means.

2. In a cotton stripper, a stripping unit having mechanism for removing bolls from cotton plants as it is moved along a row thereof, a pair of side walls on the unit for guiding the plants into the mechanism, a hood for the unit, said hood having a top wall extending between said side walls, front and rear rigid links each pivotally connected to the top wall and to the unit for swinging the hood between raised and lowered positions.

3. In a cotton stripper, a stripping unit having mechanism for removing bolls from cotton plants as it is moved along a row thereof, a pair of side walls on the unit for guiding the plants into the mechanism, a hood for the unit, said hood having a top wall extending between said side walls, front and rear rigid links each pivotally connected to the top wall and to the unit for swinging the hood between raised and lowered positions, a spring means connecting the hood to the unit to bias the hood toward a raised position.

4. In a cotton stripper, a stripping unit having mechanism for removing bolls from cotton plants as it is moved along a row thereof, a pair of side walls on the unit for guiding the plants into the mechanism, a hood for the unit, said hood having a top wall extending between said side walls, front and rear rigid links each pivotally connected to the top wall and to the unit for swinging the hood between raised and lowered positions, a spring means connecting the hood to the unit to bias the hood toward a raised position, and a latch means on the unit selectively engageable with the hood to lock the hood in a lowered position against action of the spring means.

5. In a cotton harvester, a stripping device having mechanism for stripping bolls from cotton plants as it is moved along a row thereof, said device including a pair of transversely spaced generally parallel side walls disposed one at each side of said mechanism, said side walls each having independent upper and lower sections, the two upper sections being integrally connected to each other as a single unit, and said unit being pivotally connected on a transverse axis to the device for swinging movement between rearward raised and forward lowered positions relative to the side wall lower sections.

6. In a cotton stripper adapted to be mounted on a draft imprement, a stripping unit having mechanism for removing bolls from cotton plants as it is moved by the impement along a row thereof, a pair of laterally spaced upright sheets on the unit, a hood having a pair of side walls connected by a top wall, said hood mounted on the unit and adapted to fit between the side sheets with the side walls parallel to said side sheets at each side of the unit, and pivoted link means effecting said hood mounting enabling the hood to be swung vertically between raised operating and lowered non-operating positions, and the front edges of said walls being curled outwardly to engage the front edges of said sheets and limit raising movement of the hood.

7. In a cotton harvester, a cotton stripping unit having mechanism for removing bolls from cotton plants as it is moved along a row thereof, a pair of generally parallel transversely spaced side sheets on the unit for guiding the plants into the mechanism, an inverted trough-shaped hood having side walls connected by a top wall, and means for mounting the hood on the unit to cover the area between the side sheets, said means comprising a pair of longitudinally spaced rigid links each having its lower end pivoted on a transverse axis to the unit and having a right angular extension at its upper end journaled crosswise on the top wall of the hood whereby the hood may be swung between a forward collapsed position and a rearward raised position, stop means on the hood, means on the unit engageable with the stop means to limit rearward movement of the hood, and a tension spring connecting the hood to a point on the unit rearward thereof to urge the hood toward its rearward raised position.

References Cited in the file of this patent
UNITED STATES PATENTS

| 685,111 | Dannelly | Oct. 22, 1911 |
| 2,672,719 | Wagnon | Mar. 23, 1954 |
| 2,760,325 | Witt | Aug. 28, 1956 |